US007617029B2

(12) United States Patent
Loda

(10) Patent No.: US 7,617,029 B2
(45) Date of Patent: Nov. 10, 2009

(54) SYSTEM AND METHOD FOR FAULT CODE DRIVEN MAINTENANCE SYSTEM

(75) Inventor: David C Loda, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 432 days.

(21) Appl. No.: 11/184,251

(22) Filed: Jul. 19, 2005

(65) Prior Publication Data

US 2006/0015777 A1 Jan. 19, 2006

Related U.S. Application Data

(60) Provisional application No. 60/589,165, filed on Jul. 19, 2004.

(51) Int. Cl.
*G06F 19/00* (2006.01)

(52) U.S. Cl. .......................................... 701/33; 700/83

(58) Field of Classification Search ............. 701/29–31, 701/33–35; 700/83, 86, 87, 89; 73/196, 73/197.1, 117.2, 118.1, 117.3
See application file for complete search history.

(56) References Cited

U.S. PATENT DOCUMENTS

| | | | | |
|---|---|---|---|---|
| 4,796,206 | A | 1/1989 | Boscove et al. | |
| 5,732,074 | A | 3/1998 | Spaur et al. | |
| 5,916,286 | A | 6/1999 | Seashore et al. | |
| 6,014,598 | A | 1/2000 | Duyar et al. | |
| 6,263,268 | B1 * | 7/2001 | Nathanson | 701/29 |
| 6,397,131 | B1 * | 5/2002 | Busch et al. | 701/29 |
| 6,691,064 | B2 * | 2/2004 | Vroman | 702/183 |
| 6,801,849 | B2 * | 10/2004 | Szukala et al. | 701/114 |
| 6,826,500 | B2 * | 11/2004 | Linthicum et al. | 702/98 |
| 7,079,982 | B2 * | 7/2006 | Ogura et al. | 702/185 |
| 2005/0060070 | A1 * | 3/2005 | Kapolka et al. | 701/29 |

OTHER PUBLICATIONS

International Search Report dated Jan. 25, 2008.

* cited by examiner

*Primary Examiner*—Dalena Tran
(74) *Attorney, Agent, or Firm*—Carlson Gaskey & Olds PC

(57) ABSTRACT

A system, program instructions or method for maintaining a deployed product having at least one component, as well as training of the maintenance workers, is provided. The system has a microserver, a sensor and an electronic device. The microserver is integral with the deployed product. The sensor is in communication with the microserver and operably connected to the component for monitoring parameters of the component. The sensor communicates the parameters to the microserver. The electronic device is in wireless communication with the microserver and remotely located from the microserver. The electronic device receives fault code signals that are generated by the microserver. The fault code signals are representative of a fault code for the component based upon the parameters. The electronic device indicates the fault code for the component. The system can also be used for generating artificial fault codes and evaluating training exercises based upon responses to said artificial fault codes.

22 Claims, 4 Drawing Sheets

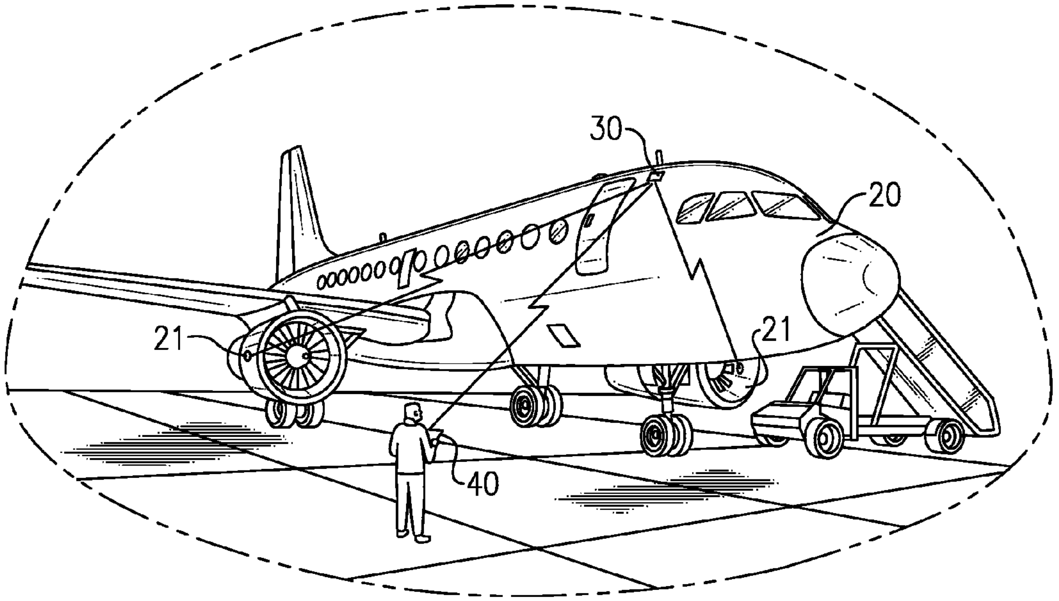
FIG.2
FIG.2A
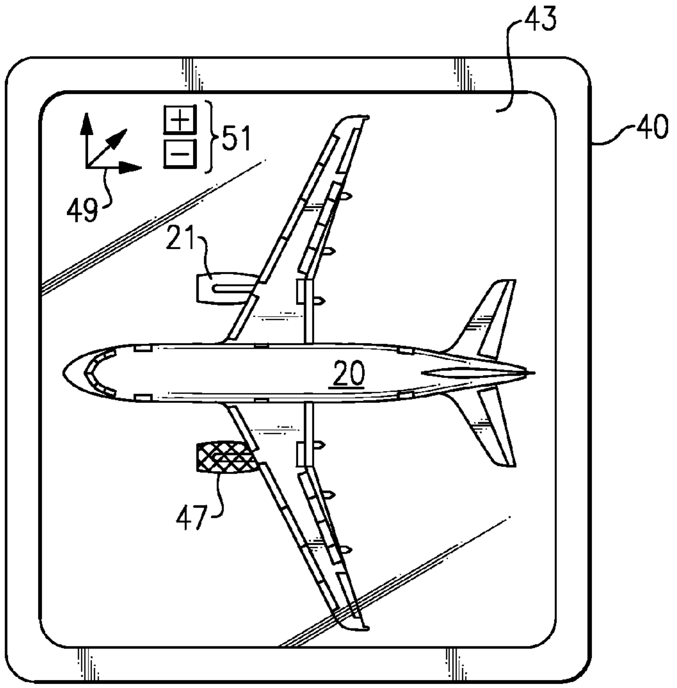

SYSTEM AND METHOD FOR FAULT CODE DRIVEN MAINTENANCE SYSTEM

RELATED APPLICATIONS

This application is related to, and claims priority in, co-pending U.S. Patent Application No. 60/589,165, filed on Jul. 19, 2004, the disclosure of which is herein incorporated by reference.

BACKGROUND OF THE INVENTION

This invention relates to systems and methods for maintaining an asset, such as a vehicle. Specifically, the invention relates to systems and methods for maintaining an asset, utilizing fault code-driven and three-dimensional directed maintenance and troubleshooting.

There are three general types of maintenance for products. They are on-demand maintenance (usually when a product breaks), scheduled maintenance (based upon the factory's best estimate when something will wear out with normal usage), and condition based maintenance (maintenance that occurs when maximum usage is obtained from a part but just prior to part failure). On demand maintenance is self-explanatory—a component fails and has to be repaired or replaced. This normally occurs as an end result of its operators not understanding its component life or the conditions of its use, and the highest costs—both physical and lost time—are associated with it. Unfortunately, it is also among the most common maintenance. Scheduled maintenance is less costly but can be very wasteful. Depending upon the product's usage, one may be replacing parts that still have a significantly useful life. This is also where corners tend to be cut by the customer when budgets become tight, and often lead back to the first type of maintenance described above, sometimes with catastrophic results. The third form of maintenance is condition-based maintenance and is the holy grail of maintenance in many industries. If a manufacturer or service organization can accurately ascertain the maximum life of a component based upon actual wear, tear, and usage, it would then allow for the optimized, just-in-time servicing and replacement of that component, thereby allowing for the user to gain maximum product life and to schedule the replacement at a non-critical time. As a result, a manufacturer utilizing condition based maintenance could better plan its spares production and save millions of dollars in unnecessary production, warehousing and inventory taxes.

There is however a catch to condition-based maintenance—there must exist a closed feedback loop system of information related to each product's use. Without first-hand knowledge of how a product is being used after it is sold and deployed to the field, a manufacturer or service provider has no real way of knowing when components will wear out based on usage, and must therefore default back to using one or both of the first two types of maintenance described above. Operators are in the best position to gather this first hand knowledge, but most are too busy operating and making money with the product and have little time, money and/or inclination to attempt to capture this information to provide feedback to the manufacturer or service provider—even though it is in their own best interest to do so.

In an attempt to gather useful information from the field, a variety of methods have been used to try and solve the collection of product usage data. On the low end, customer surveys, feedback forms, and interaction with field support personnel have been the primary means of obtaining a rudimentary form of feedback. For complex and expensive products, such as aircraft engines, the most common form is that of paper-based operational logs. This is a highly manual and painful method of collecting operational information. Over the years, computer collection systems have tried to make this process easier, but they still require a great deal of manual intervention.

More recent advances have involved the incorporation of automated data recording devices onto products, such as engine data units (or EDUs), which are used on turbine engines, which communicate with an engine's electronic control systems and record operational data using a variety of sensors. However, it is still extremely difficult and costly to gather information from these data collection devices, as it must be done manually by mechanics in the field using specialized equipment or laptop computers with cables, with which they usually have little familiarity or interest. The only other option is to wait until the product is returned to a shop environment for a major overhaul and repair, at which point the data from a preventative maintenance perspective is moot, and useful only from a post analysis or fleet average perspective.

A number of industries normally attempt to gather product usage intelligence through manual inspections and, more recently, laptop computer downloads performed concurrently with scheduled or on-demand maintenance service calls. This is normally accomplished by one of two methods—sending the service person to the product, bringing the product to a service center, or both. Examples of the former include products with fixed installations, such as elevators, HVAC systems, nuclear power plants, and large home appliances. Examples of the latter include automobiles, small home appliances, home electronics equipment, lawnmowers, or anything small enough to be easily carried or shipped. Both methods are inefficient and result in significant down time.

With advances in low cost computing and the advent of wireless technologies and the Internet, companies are now looking at how they can collect product usage intelligence in an automated and remote fashion. Many of the systems which have evolved such as VHF frequency, cell phone, or wireless land-based data download methods, tend to be very expensive as have attempts at using emerging technologies to accomplish essentially the same thing—remote data file compression and download to a central location using a public or private network/Internet where the information can then be manually uncompressed and analyzed. As a result, the high cost associated restricts the application of wireless remote monitoring to high value products, such as jet aircraft and helicopters. Thus, there remains a need for a low cost, wireless system which accurately ascertains the condition of a deployed product based upon actual wear, tear, and usage and present information about that condition to a user, a manufacturer, an operator, or any other interested party, that is deployable with the product and that provides greater flexibility interaction than simple data downloading. There remains a further need for a system and method for maintaining an asset utilizing fault code-driven and three-dimensional directed maintenance and troubleshooting.

BRIEF SUMMARY OF THE INVENTION

It is an object of the present invention to provide an improved system and method for maintaining an asset.

It is a further object of the present invention to provide such a system and method that performs real-time monitoring of the asset and its components.

It is another object of the present invention to provide such a system and method that communicates the information being monitored to one or more recipients, for example, an electronic device or computer.

It is another further object of the present invention to provide such a system and method for communication of such information to remote recipients, for example, an electronic device or computer.

It is yet another object of the present invention to provide such a system and method for maintaining the asset based upon a fault code-driven and three-dimensional directed maintenance and troubleshooting process.

It is still another further object of the present invention to provide such a system that provides training for the maintenance of the asset.

A system for monitoring a deployed product having at least one component is provided. The system has a microserver, a sensor and an electronic device. The microserver is integral with the deployed product. The sensor is in communication with the microserver and operably connected to the component for monitoring parameters of the component. The sensor communicates the parameters to the microserver. The electronic device is in wireless communication with the microserver and remotely located from the microserver. The electronic device receives fault code signals that are generated by the microserver. The fault code signals are representative of a fault code for the component based upon the parameters. The electronic device indicates the fault code for the component.

In another aspect, a system for monitoring a deployed product having at least one component is provided, where the system comprises a microserver integral with the deployed product; a sensor in communication with the microserver and operably connected to the component for collecting data of parameters of the component in real-time; and an electronic device in wireless communication with the microserver and remotely located from the microserver. The sensor communicates the data to the microserver. The electronic device receives fault code signals that are generated by the microserver. The fault code signals are representative of a fault code for the component based upon the data. The electronic device indicates the fault code for the component.

In another aspect, a computer readable program embodied in an article of manufacture comprising computer readable program instructions for diagnostic monitoring of a deployed product having at least one component is provided. The program has program instructions for causing a computer to monitor parameters of the component collected by at least one sensor operably connected to the component; program instructions for causing the computer to generate fault code signals representative of a fault code for the component based upon the parameters; and program instructions for causing the computer to wirelessly communicate the fault code signals to an electronic device that is remotely located from the deployed product for displaying of the fault code of the component.

In another aspect, a method of monitoring a deployed product is provided comprising collecting data representative of parameters of a component of the deployed product via a sensor and a microserver integral with the deployed product; generating a fault code for the component based upon the data; wirelessly communicating a fault code signal representative of the fault code of the component to a remotely located electronic device; and indicating the fault code for the component on the electronic device.

In another aspect, a system for training maintenance workers for maintaining a product having at least one component is provided. The system has a microprocessor, a server and an electronic device. The microprocessor generates an artificial fault code for the component. The server is in communication with the microprocessor for communicating fault code signals representative of the artificial fault code. The electronic device is in communication with the server and microprocessor, but remotely located from the server and microprocessor. The electronic device receives the fault code signals, and displays a visual image of at least the component exhibiting the artificial fault code. The electronic device has a user interface for inputting maintenance functions to be performed on the component based upon the artificial fault code.

In another aspect, a computer readable program embodied in an article of manufacture comprising computer readable program instructions for training a maintenance worker to maintain a product having at least one component is provided. The program comprises program instructions for causing a computer to read fault code signals communicated from a remotely located server, with the fault code signals being representative of an artificial fault code for the component; program instructions for causing the computer to generate three-dimensional drawings of at least the component exhibiting the artificial fault code; program instructions for causing the computer to read task data representative of maintenance functions to be performed on the component based upon the artificial fault code, with the task data being inputted into a user interface of the computer; and program instructions for causing the computer to communicate task signals representative of the task data to the server.

In another aspect, a method of training maintenance workers for maintaining a product having at least one component is provided. The method comprises generating an artificial fault code for the component; communicating fault code signals representative of the artificial fault code to a remotely located electronic device; displaying a visual image on the electronic device of at least the component exhibiting the artificial fault code; providing for the maintenance worker to input task data representative of maintenance functions to be performed on the component based upon the artificial fault code via a user interface of the electronic device; and evaluating the inputted maintenance functions for accuracy.

The fault code signals can be generated in real-time. The fault code signals may be communicated to the electronic device in real-time. The electronic device can display a visual image of at least the component exhibiting the fault code. The visual image may be a three-dimensional image. The electronic device can indicate maintenance functions to be performed on the component based upon the fault code.

The microserver may be in communication with an on-board computer of the deployed product and may communicate the fault code signals to the on-board computer to indicate the fault code for the component. The electronic device can generate task signals representative of maintenance performed on the component exhibiting the fault code, with the task signals being communicated by the electronic device to the microserver to indicate resolution of the fault code for the component. The microserver may communicate a resolution signal representative of the resolution of the fault code to a maintenance log of the deployed product.

The program may have program instructions for causing the computer to generate the fault code signals in real-time. The program can have program instructions for causing the computer to communicate the fault code signals to the electronic device in real-time. The program may have program instructions for causing the computer to communicate the fault code signals to an on-board computer of the deployed product to indicate the fault code for the component.

The program can have program instructions for wirelessly receiving task signals representative of maintenance performed on the component exhibiting the fault code to indicate resolution of the fault code for the component. The program may have program instructions for generating a resolution signal representative of the resolution of the fault code. The program can have program instructions for wirelessly communicating the resolution signal to a maintenance log of the deployed product.

The method can further comprise collecting the data in real-time, generating the fault code in real-time, and wirelessly communicating the fault code signal in real-time. The method may further comprise displaying a three-dimensional visual image of at least the component exhibiting the fault code on the electronic device. The method can further comprise indicating maintenance functions to be performed on the component based upon the fault code. The method may further comprise communicating the fault code signal to an on-board computer to indicate the fault code for the component.

The method can further comprise generating task signals representative of maintenance performed on the component exhibiting the fault code and communicating the task signals to the microserver to indicate resolution of the fault code for the component. The method may further comprise generating task signals representative of maintenance performed on the component exhibiting the fault code, communicating the task signals to the microserver to indicate resolution of the fault code for the component, and communicating a resolution signal representative of the resolution of the fault code to a maintenance log of the deployed product.

The microprocessor can evaluate the inputted maintenance functions for accuracy. The artificial fault code may be based upon trends in real-world maintenance needs. A sample component representative of the component exhibiting the artificial fault code may be provided as part of the system or method. The visual image may be adjusted by the electronic device based upon a change in position of the electronic device with respect to the sample component or component of the deployed product. The program may have program instructions for causing the computer to adjust the visual image or three dimensional drawings based upon a change in position of the computer with respect to an actual or sample component provided that is representative of the component exhibiting the artificial fault code. The method may provide rewards to the maintenance workers based at least in part on the accuracy of the inputted maintenance performance.

BRIEF DESCRIPTION OF THE DRAWINGS

Other uses and advantages of the present invention will become apparent to those skilled in the art upon reference to the specification and the drawings, in which:

FIG. 2 is an other schematic view of the system of FIG. 1 with a maintenance worker utilizing the electronic device for communication with the microserver;

FIG. 2A is a display of one component of the system shown in FIG. 1;

DETAILED DESCRIPTION OF THE INVENTION

Figure 1:
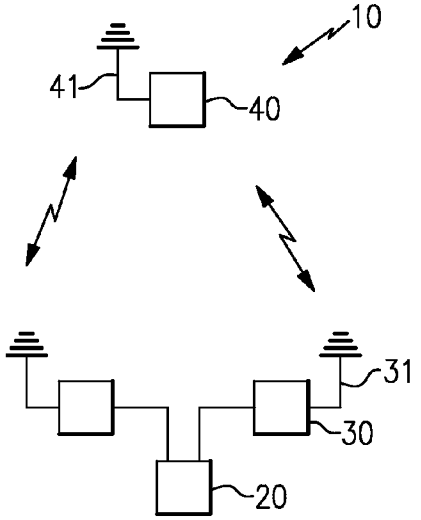
FIG. 1 is a schematic view of an exemplary embodiment of the system of the present invention.
Figure 1A:
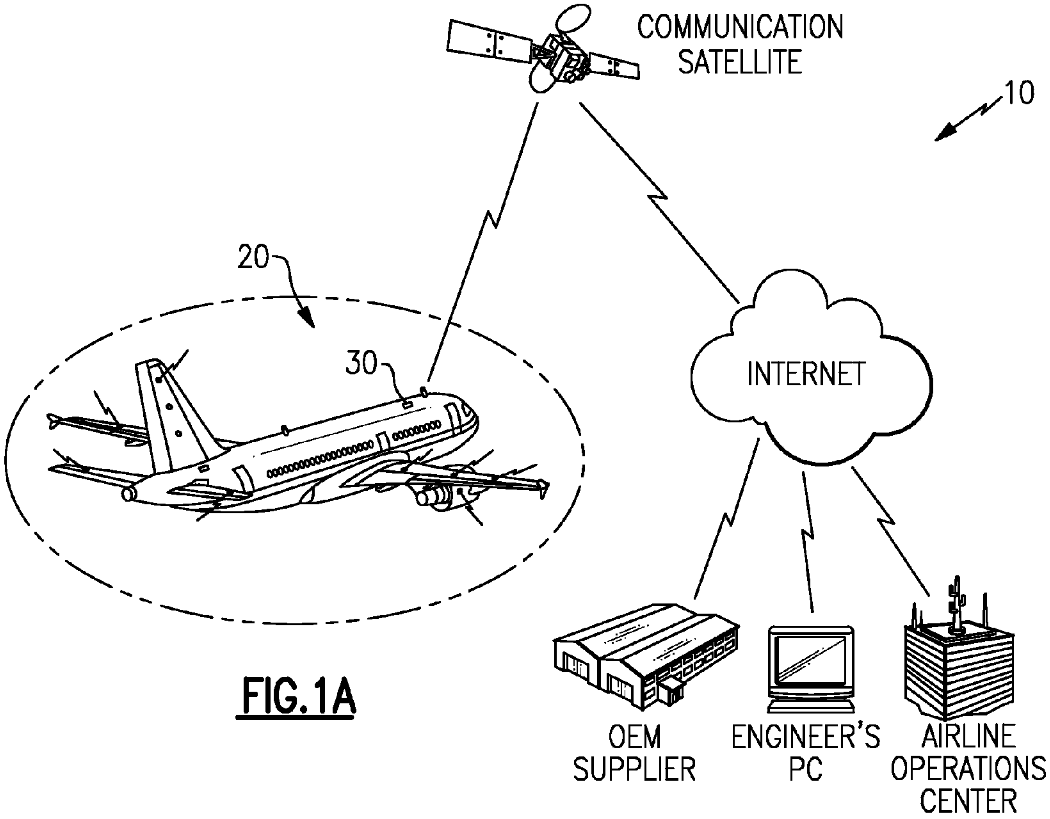
FIG. 1A is another schematic view of the system of FIG. 1 showing multiple electronic devices.

FIG. 1 provides a schematic view of an exemplary embodiment of the system of the present invention generally represented by reference numeral 10. The system 10 is used with an asset or deployed product 20. In the exemplary embodiment described herein, the asset 20 is an aircraft. However, the present disclosure contemplates system 10 being part of other assets 20, such as, for example, a ship, truck or spacecraft. The system 10 is integral with the asset 20, with such connection or formation being made either during the original manufacture of the asset or during an aftermarket modification of the asset.

The system 10 includes one or more microservers 30 used, for example, to monitor or communicate with the entire asset 20, or one or more sub-components of the asset 20 (e.g., engines 21, auxiliary power units, environmental control systems, avionics, etc.) or one or more items on-board the asset (e.g., shipping containers, crew or passenger computers, etc.).

The microserver 30 can achieve two-way communication with other electronic devices or other recipients wirelessly using, for example, antenna 31. The microserver 30 could also directly communicate with other electronic devices or recipients using, for example, suitable cabling. U.S. patent application Ser. No. 10/155,593 describes additional features of the microserver 30, the disclosure of which is herein incorporated by reference. This application is also related to U.S. patent application Ser. No. 10/767,601 (filed on Jan. 28, 2004), Ser. No. 10/832,725 (filed on Apr. 27, 2004), and Ser. No. 10/832,727 (filed on Apr. 27, 2004), all of which are herein incorporated by reference. Communication by microserver 30 can include in-flight communication to multiple electronic devices or recipients including on-board computers or recipients and remote computers or recipients, as well as communication to other microservers on-board the asset.

One such electronic device to which the microserver 30 can communicate is a remote computer such as the tablet-based personal computer 40 shown in FIG. 1. The electronic device could be any other suitable device, including a personal digital assistant (PDA). As shown in FIG. 1, the tablet 40 includes an antenna 41 to wirelessly communicate with the microserver 30. As discussed above, the electronic device could be directly connected to the microserver 30 using, for example, suitable cabling.

The tablet 40 includes a screen 43 to display suitable information and/or images as will be discussed in greater detail below. The tablet 40 preferably uses a web browser to display such information. The tablet 40 also includes an input device such as a stylus 45.

The operation of the system will now be described. The microserver 30 monitors the asset 20 (or, as described above, its sub-components or items located on-board). For example, the microserver 30 could monitor the engines for any data or fault codes provided by various sensors within the engines 21, which are in communication with the microserver. The microserver 30 provides an alert upon the presence of a fault code. The alert could go to any suitable location or multiple locations (e.g., the “home” maintenance facility, the Original Equipment Manufacturer, the crew, other microservers, and/or maintenance technicians). It should be understood by one of ordinary skill in the art that the communication system and method of communication can be varied to facilitate monitoring of the asset 20 and can include, but is not limited, to communication from the sensor of a particular component to an asset control system, such as, for example, a FEDEC, EEC and/or black box, and to the microserver 30. Alternative routing of the communication from the sensor to the microserver 30 is also contemplated. Additionally, the sensor can be any device that monitors asset parameters, and can include, but is not limited to, communication from the asset control system to the microserver 30 or directly from a sensor to the microserver.

The process described above for the monitoring of asset 20 and/or the monitoring for fault codes can be a software program or application that can be run on the microserver 30, the electronic device, e.g., tablet 40, or other such device, and can be a computer program product having a computer useable medium with a computer readable code means embodied in the medium for monitoring of asset 20 and/or communication with the various sensors that are operably connected with the components and sub-components of the asset. The software program or application can be readable by the microserver 30, the electronic device, e.g., tablet 40, or other such device, tangibly embodying a program of instructions executable by the microserver to perform the above-described operation for monitoring the asset 20. However, the present disclosure contemplates implementation of the operation described herein in alternative ways as well.

As shown in FIG. 2, upon receiving a fault code, a maintenance technician may wish to perform maintenance or troubleshooting on the asset 20. The tablet 40 assists the technician in performing such maintenance or troubleshooting. Using information residing on the microserver 30 (or even the tablet 40), such as three-dimensional CAD models, the tablet displays an image of the asset. FIG. 2A shows such an image. To assist the technician, the tablet 40 also provides a visual identification (for example, the hatching 47) of the item exhibiting the fault code. FIG. 2A shows that the number one engine has exhibited a fault code. Using the stylus 45, the technician can adjust the image. For example, the technician can change the perspective of the image by manipulating the axis icon 49 on the screen 43. The technician can change the size of the image by manipulating the zoom icon 51 on the screen 43.

Figure 3:
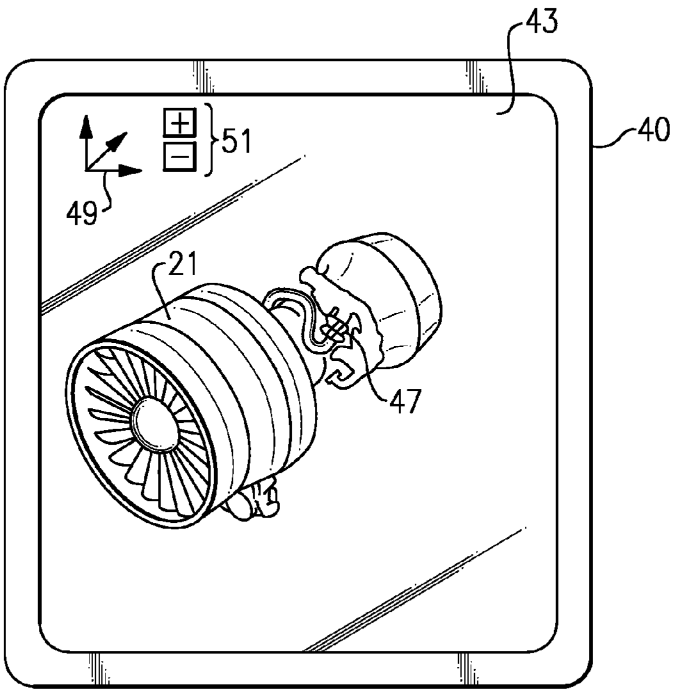
FIG. 3 is another display of the component of FIG. 2A.

Using the same information described above, the tablet 40 can also display images of specific sub-components. The technician can obtain this detailed image, for example, by tapping the engine 21 on the screen 43 of the tablet 40. For example, FIG. 3 provides an image of the engine 21. Similar to FIG. 2A, FIG. 3 includes a visual identification (the hatching 47) of the item of the engine 21 exhibiting the fault code. Using the stylus 45, the technician can also adjust this image. For example, the technician can change the perspective of the image by manipulating the axis icon 49 on the screen 43. The technician can change the size of the image by manipulating the zoom icon 51 on the screen 43.

The present disclosure contemplates the electronic device, such as, for example, tablet 40, having a dynamic visual display. The visual display or image can be position sensitive with respect to the asset 20. As the tablet 40 is moved about the asset 20, the visual display on tablet 40 will adjust as to view, orientation, size and/or components to reflect the movement of the tablet 40 with respect to the asset 20.

The present disclosure contemplates the viewer of tablet 40 adjusting, selecting or limiting the changes to the visual display as desired, similar to the selections described above with respect to stylus 45. For example, the viewer may want the dynamic function turned off so that the image shown is constant regardless of movement of the tablet or the viewer may want the size of the image to remain constant while the orientation is adjusted based upon the orientation or movement of the tablet 40 with respect to the asset 20. The dynamic visual display of tablet 40 facilitates the viewer discerning the component that is to be worked on, such as, for example, changing the view displayed for a component from a first side to the opposite side when the worker walks over to the opposite side of the component.

Figure 4:
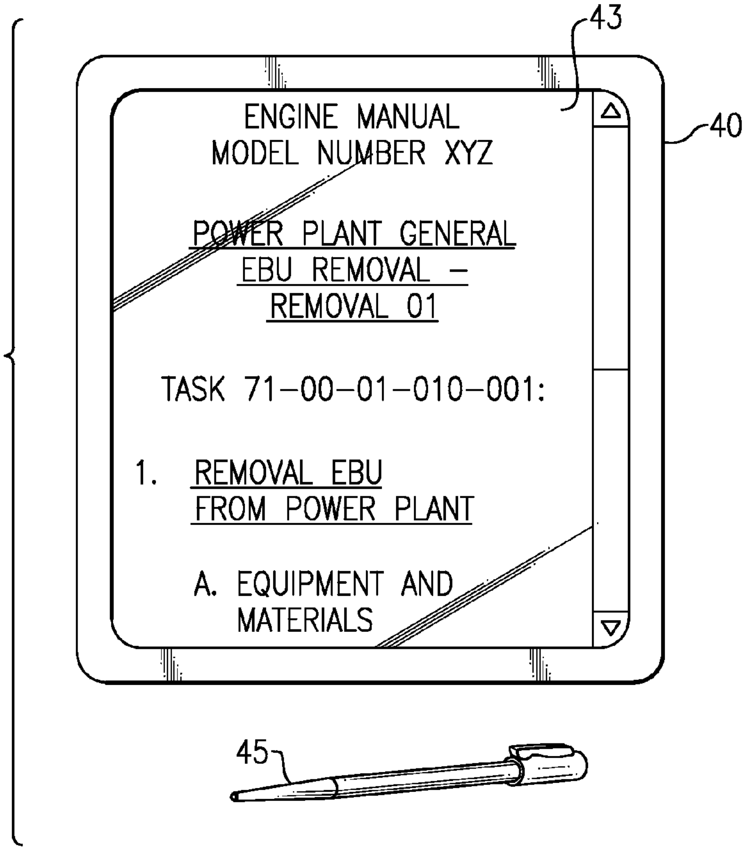
FIG. 4 is another display of the component of FIG. 2A.

With full knowledge of the exact location of the sub-component producing a fault code, the system 10 also assists the maintenance technician perform maintenance or troubleshooting. The tablet 40 assists the technician in performing such maintenance or troubleshooting by displaying relevant information that resides on the microserver 30 (or even the tablet 40), such as technical publications or manuals. For example, the microserver 30 determines, given the fault code location, which maintenance or troubleshooting tasks the maintenance technician must perform on the aircraft 20. The tablet 40 then displays these necessary tasks. As seen in FIG. 4, the tablet 40 displays relevant tasks from the engine manual. The technician could indicate completion of the task displayed by the tablet, for example, by tapping a Task Complete icon (not shown) on the screen. The tablet 40 would then display the next task that the technician needs to perform. This process preferably repeats until the technician has performed all of the tasks necessary to resolve the fault code.

In addition or as a substitution for the visual presentation of information to the maintenance technician, the tablet could provide verbal guidance using suitable software.

Using the two-way communication feature of the system 10, the system 10 preferably updates the maintenance records for the aircraft 20, for example, by notifying the "home" maintenance facility or updating the electronic maintenance log for the aircraft with information regarding the successful resolution of the fault code.

The communication described herein can include the generation of various signals representative of the information or data to be transmitted, such as, for example, fault code signals representative of a fault code for a component of asset 20, task signals representative of maintenance performed on the component exhibiting the fault code, and resolution signals representative of the resolution of the fault code for the component.

The microserver 30 provides embedded product intelligence that facilitates the maintenance of the asset 20. The microserver 30 provides a wireless onboard server host that enables the use of multiple software applications for the collection of data from the asset 20 and its components, and the processing of that data to provide real-time monitoring for maintenance of the asset. It is contemplated by the present disclosure for microserver 30 and/or the electronic device, e.g., tablet 40, to include any circuit and/or programmable circuit which facilitates the function described above with respect to system 10, such as, but not limited to, computers, processors, microcontrollers, microcomputers, programmable logic controllers, application specific integrated circuits, programmable circuits and dedicated circuits including wireless communication capability. It is further contemplated by the present disclosure that microserver 30 is any number of devices providing various types of monitoring, e.g., centralized, distributed, dedicated and/or redundant.

The use of different software applications with microserver 30 and/or the electronic device, e.g., tablet 40, enables the collection and processing of various data associated with various parameters that are later defined (after the microserver 30 has been integrated with the asset 20) as a requirement for the monitoring of the asset, such as, for example, auxiliary power unit monitoring, environmental air temperature, environmental humidity, environmental air quality, and/or engine vibration. The two-way communication for microserver 30 allows for multiple recipients of the processed data, such as, for example, both the on-board computers and the "home" maintenance facility (e.g., tablet 40).

Figure 5:
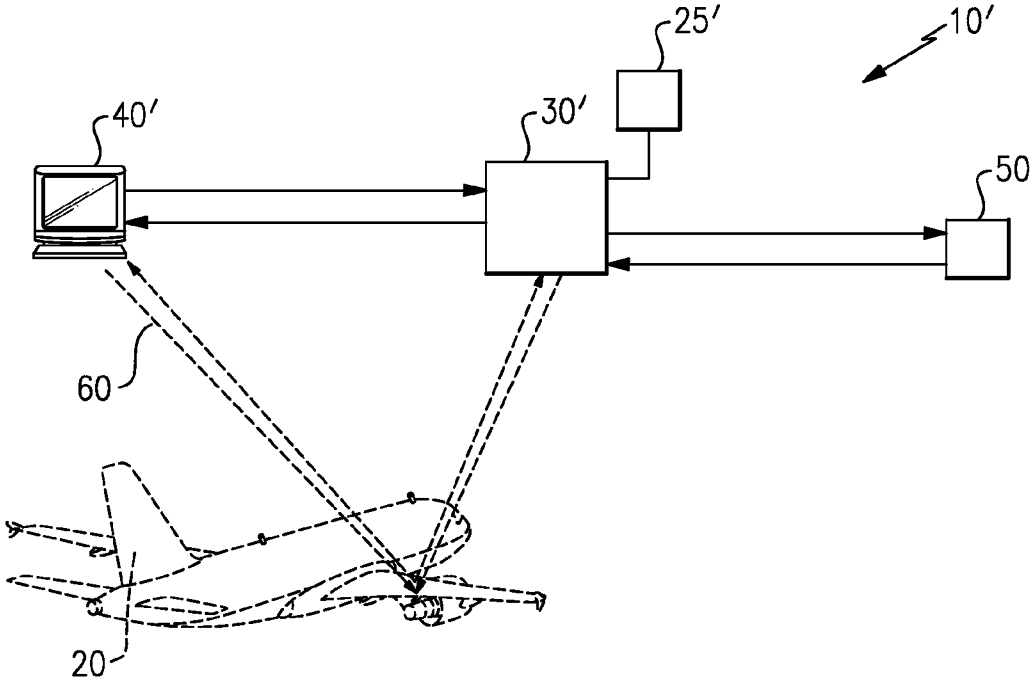
FIG. 5 is a schematic view of another exemplary embodiment of the system of the present invention for training of maintenance workers.

Referring to FIG. 5, in an alternative embodiment, system 10' is used for the training of maintenance workers based upon the generation of fault codes for components and sub-components of assets 20', and the resolution of those fault codes. The training can be based upon the generation of artificial fault codes, which are communicated to electronic devices, such as, for example, a personal computer 40' having a user interface, which are remotely located from the maintenance facility.

The artificial fault codes can be generated via a microprocessor 25' or other device at the maintenance facility or other centralized location, and communicated via a server 30' or other electronic communication device so that a viewer receives the fault code at the remotely located electronic device. The viewer can then engage in a training exercise similar to the exercise described, which preferably includes the use of three-dimensional visual displays of the asset 20' and its components, such as, for example, CAD drawings. The viewer can make selections on the PC 40' as to the maintenance to be performed via the user interface, which is communicated back to the server 30'. Training system 10' does not require an actual asset 20' or a microserver connected to the asset but can rely upon a virtual asset 20'.

The training exercise and the artificial maintenance performance of the viewer can be evaluated to provide a gaming-type experience for the maintenance worker to increase interest in the training exercise. Such training exercises and evaluations can be done over a continuous process and allow for scoring and advancement in the training exercise for the maintenance worker to further increase interest in such a training exercise. The present disclosure contemplates storing of each of the maintenance workers exercises and/or evaluations in a database 50, as well as gaming-type advancement through the training exercise process, such as, for example, advancing to increasing levels (e.g., mechanic level 2, etc.) and advancing through increasing levels of difficulty and/or responsibility. The scoring system and advancement of the maintenance worker through the series of training exercises can be awarded which will provide further incentive and interest in participating in the training exercises.

The training exercise can be based upon a particular established or dynamic curriculum. The present disclosure contemplates the curriculum and/or artificial fault codes that are generated being based upon maintenance need trends being monitored in the real-world, such as, for example, recent problems being experienced with a particular component of a particular asset 20. The training system described above is not limited to a particular type of asset 20' and can be used to train the maintenance workers on various assets of the fleet.

The present disclosure contemplates the electronic device 40' being similar to tablet 40 described above, where the training exercise may take place with the aid of a sample asset 20 or one or more sample components of the asset, such as, for example, engines that are used in a training facility for maintenance training. The sample asset 20 or one or more sample components of the asset may have microservers 30 as described above that are in communication with the PC 40', microprocessor 25' and/or server 30' to facilitate the training exercise, as shown by dashed lines 60 in FIG. 5.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A system for monitoring a deployed product having at least one component, the system comprising:

a microserver integral with the deployed product;

a sensor in communication with said microserver and operably connected to the component for monitoring parameters of the component, wherein said sensor communicates said parameters to said microserver; and an electronic device in wireless communication with said microserver and remotely located from said microserver, wherein said electronic device receives fault code signals that are generated by said microserver, wherein said fault code signals are representative of a fault code for the component based upon said parameters, wherein said electronic device indicates said fault code for the component, wherein said electronic device displays a visual image of at least the component exhibiting said fault code.

2. The system of claim 1, wherein said visual image is a three-dimensional image.

3. The system of claim 1, wherein said fault code signals are communicated to said electronic device in real-time.

4. The system of claim 1, wherein said electronic device indicates maintenance functions to be performed on the component based upon said fault code.

5. The system of claim 1, wherein said microserver is in communication with an onboard computer of the deployed product and communicates said fault code signals to the on-board computer to indicate said fault code for the component.

6. The system of claim 1, wherein said electronic device generates task signals representative of maintenance performed on the component exhibiting said fault code, and wherein said task signals are communicated by said electronic device to said microserver to indicate resolution of said fault code for the component.

7. The system of claim 6, wherein said microserver communicates a resolution signal representative of said resolution of said fault code to a maintenance log of the deployed product.

8. The system of claim 1, wherein the electronic device is operative to provide verbal guidance.

9. The system of claim 1, wherein the component comprises a virtual component and the fault code comprises an artificial fault code.

10. The system of claim 1, wherein the electronic device automatically displays a visual image of at least a component exhibiting the fault code.

11. A computer readable program embodied in an article of manufacture comprising computer readable program instructions for diagnostic monitoring of a deployed product having at least one component, said program comprising:

program instructions for causing a computer to read fault code signals wirelessly communicated from a microserver on-board the deployed product, wherein said fault code signals are representative of a fault code for the component based on parameters of the component collected by at least one sensor operably connected to the component; and program instructions for causing said computer to generate three-dimensional drawings of at least the component exhibiting said fault code.

12. The program of claim 11, further comprising:

program instructions for causing said computer to generate task signals representative of maintenance performed on the component exhibiting said fault code to indicate resolution of said fault code for the component; and program instructions for causing said computer to wirelessly communicate said task signals to said microserver of the deployed product.

13. The program of claim 11, wherein said program instructions cause said computer to adjust said three-dimensional drawings based upon a relative change in position between said computer and the deployed product.

14. A method of monitoring a deployed product comprising:

collecting data representative of parameters of a component of the deployed product via a sensor and a microserver integral with the deployed product;

generating a fault code for said component based upon said data;

wirelessly communicating a fault code signal representative of said fault code of said component to a remotely located electronic device;

indicating said fault code for said component on said electronic device; and displaying a visual image of at least said component exhibiting said fault code on said electronic device.

15. The method of claim 14, further comprising collecting said data in real-time, generating said fault code in real-time, and wirelessly communicating said fault code signal in real-time.

16. The method of claim 14, further comprising displaying a three-dimensional visual image of at least said component exhibiting said fault code on said electronic device.

17. The method of claim 14, further comprising adjusting said visual image based upon a position of said electronic device with respect to the deployed product.

18. The method of claim 14, further comprising indicating on said electronic device any maintenance functions to be performed on said component based upon said fault code.

19. The method of claim 14, further comprising communicating said fault code signal to an on-board computer to indicate said fault code for the component.

20. The method of claim 14, further comprising generating task signals representative of maintenance performed on said component exhibiting said fault code and communicating said task signals to said microserver to indicate resolution of said fault code for said component.

21. The method of claim 20, further comprising communicating a resolution signal representative of said resolution of said fault code to a maintenance log of the deployed product.

22. The method of claim 14, further comprising displaying a first image of at least said component when said electronic device is positioned on a first side of said component and automatically adjusting said visual image to display a second image of at least said component when said electronic device moves to an opposite side of said component, said first image representing the first side of said component and said second image representing the opposite side of said component.

* * * * *

UNITED STATES PATENT AND TRADEMARK OFFICE

CERTIFICATE OF CORRECTION

PATENT NO. : 7,617,029 B2
APPLICATION NO. : 11/184251
DATED : November 10, 2009
INVENTOR(S) : David C Loda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Nineteenth Day of October, 2010

David J. Kappos

*Director of the United States Patent and Trademark Office*